(12) United States Patent
Yeh et al.

(10) Patent No.: US 6,697,320 B2
(45) Date of Patent: Feb. 24, 2004

(54) CLAMPING DEVICE WITH VARIABLE CLAMPING FORCE

(75) Inventors: Shih-Lin Yeh, Hsinchu (TW); Tsing-Sung Hsu, Hsinchu (TW); Yi-Cheng Tsao, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 293 days.

(21) Appl. No.: 09/879,211

(22) Filed: Jun. 13, 2001

(65) Prior Publication Data
US 2002/0191531 A1 Dec. 19, 2002

(51) Int. Cl.⁷ .............................................. G11B 23/00
(52) U.S. Cl. ....................................................... 369/270
(58) Field of Search ................................ 369/270, 271, 369/291, 264, 290; 360/99.08

(56) References Cited

U.S. PATENT DOCUMENTS

| | | | | |
|---|---|---|---|---|
| 4,649,532 A | * | 3/1987 | Aldenhoven | 369/270 |
| 5,193,084 A | * | 3/1993 | Christiaens | 369/258 |
| 5,379,287 A | * | 1/1995 | Heinrich | 369/270 |
| 5,646,934 A | * | 7/1997 | Mizuno et al. | 369/290 |
| 6,532,205 B2 | * | 3/2003 | Sato et al. | 369/270 |

* cited by examiner

Primary Examiner—Allen Cao
(74) Attorney, Agent, or Firm—Rosenberg, Klein & Lee

(57) ABSTRACT

A clamping device with variable clamping force of an optical disk drive is disclosed. The main structure consists of a base, a resilient body with restoring property, an annulus magnet (or an annulus yoke) which can exert attraction force to a turntable for clamping disk, and a linking member which can change height of the annulus magnet (or the annulus yoke) relative to base according to the centrifugal force induced by variation of rotational speed of the optical disk drive. The centrifugal force is proportional to square of angular velocity such that the gap between the annulus magnet and the annulus yoke is accordingly adjustable. Variable clamping force is thus achieved by variation of the gap.

5 Claims, 5 Drawing Sheets

CLAMPING DEVICE WITH VARIABLE CLAMPING FORCE

FIELD OF THE INVENTION

The present invention relates to a clamping device with variable clamping force, especially to a clamping device by employing force balance between restoring force of resilient body and centrifugal force of moving mass to provide variable clamping force at different rotational speed application of an optical disk drive.

BACKGROUND OF THE INVENTION

Optical disk drives with higher transfer rate and faster access capability become more and more popular as the information storage demand is drastically increased. Historically, the access speed is increased from 1× speed at early stage to 52× speed (max) nowadays. In other word, the rotational speed of spindle motor is also increased from 200~500 RPM to more than 10,000 RPM. A drive operating at high-speed access will induce more vibration and centrifugal force on disk; therefore, the clamping device should guarantee sufficient clamping force to prevent the disk flip-flop away from turntable.

However, cost of the optical disk drive increases as aimed at providing larger constant clamping force for a traditional clamping device. Moreover, the tray motor exhausts more power and larger current during the loading and unloading process. Meanwhile, unpleasant noise possibly occurs and the disk may be dropped out of the tray if a large jerk happened by overcoming the so-called larger de-clamping force.

As shown in FIG. 1, a prior art of clamping device is comprised of a spindle motor 1a to rotate an optical disk 3a. A turntable 2a is to support the optical disk 3a thereon, thus maintaining suitable run out for a pick-up head to stably access information from disk. A rubber pad 20a is attached on the turntable 2a to provide sufficient friction at full speed.

Moreover, a clamping device is put upon the optical disk 3a to prevent it from dropping out. A base 4a and an annulus magnet 40a are the main components of the clamping device. A metal cover 41a is then fixed atop the annulus magnet 40a. On the other hand, an annulus yoke 21a with low carbon-concentration is mounted on the turntable 2a; a place axially aligned with the annulus magnet 40a, thus forming a constant air gap of a magnetic close-loop to firmly clamp the disk 3a. Alternatively, same effect will be achieved by mounting the magnet atop the turntable 2a and the annulus yoke 21a of low carbon-concentration atop the base 4a.

Functionally, when the optical disk 3a is put on the tray (not shown) of an optical disk drive, the spindle motor 1a will then be activated to start up. If the built-in servo system detects the existence of a disk on the tray, lens of the pick-up head will be on focus to the tracks of a disk. The spindle motor 1a is accelerated to full speed after servo on. For the unloading process, the spindle motor 1a will be braked right before de-clamping the optical disk 3a and the tray will be moved out slowly if the user likes to take back the disk 3a and trigger the eject button.

Based upon the theory of Rotor Dynamics, the centrifugal force of a rotary body is proportional to eccentric amount (imbalance) and square of rotational speed. Therefore, the clamping device should exert sufficient attraction force in normal direction and the rubber pad 20a should possess large static friction coefficient to provide secure clamping force.

However, there are some drawbacks of prior art with constant clamping force listed as following:

(1) Most of the disks are produced with thickness 1.2 mm on the market, while the allowable thickness of a standard optical disk defined by the Red Book is ranged from 1.1 mm to 1.5 mm. The thicker of the disk, the weaker of the clamping force.

(2) The optical disk drive should be able to read CDDA, VCD, and DATA disks. Functionally, DATA disk is operated at full speed while the rest at lower speed. It seems not suitable for a clamping device to provide constant clamping force no matter what the angular velocity of the disk is.

Although larger clamping force can be achieved either through increasing the magnetic energy of magnet or reducing the air gap of magnetic loop, however, cost is indeed increased for adopting high-end magnet and larger clamping force makes the disk de-clamping more difficult.

SUMMARY OF THE INVENTION

Goal of the present invention is aimed at proposing a clamping device with variable clamping force. A novel clamping device can provide variable clamping force for optical disk drives to operate at different rotational speed. Physically, people have an intuition to apply smaller clamping force at lower speed while larger one at higher speed, thus providing stable operation and cost reduction opportunity.

To achieve above object, the present invention comprises a base, a resilient body with restoring property, an annulus magnet (or an annulus yoke) which can exert attraction force to a turntable of the optical disk drive, and a linking member which can change height of the annulus magnet (or the annulus yoke) relative to base according to the centrifugal force caused by variation of rotational speed of the optical disk drive. The centrifugal force is proportional to square of rotational speed such that the gap between the annulus magnet and the annulus yoke is accordingly adjustable. Variable clamping force is thus generated by variation of the gap.

The various objects and advantages of the present invention will be more readily understood from the following detailed description when read in conjunction with the appended drawing, in which:

DETAILED DESCRIPTION OF THE INVENTION

Figure 1:
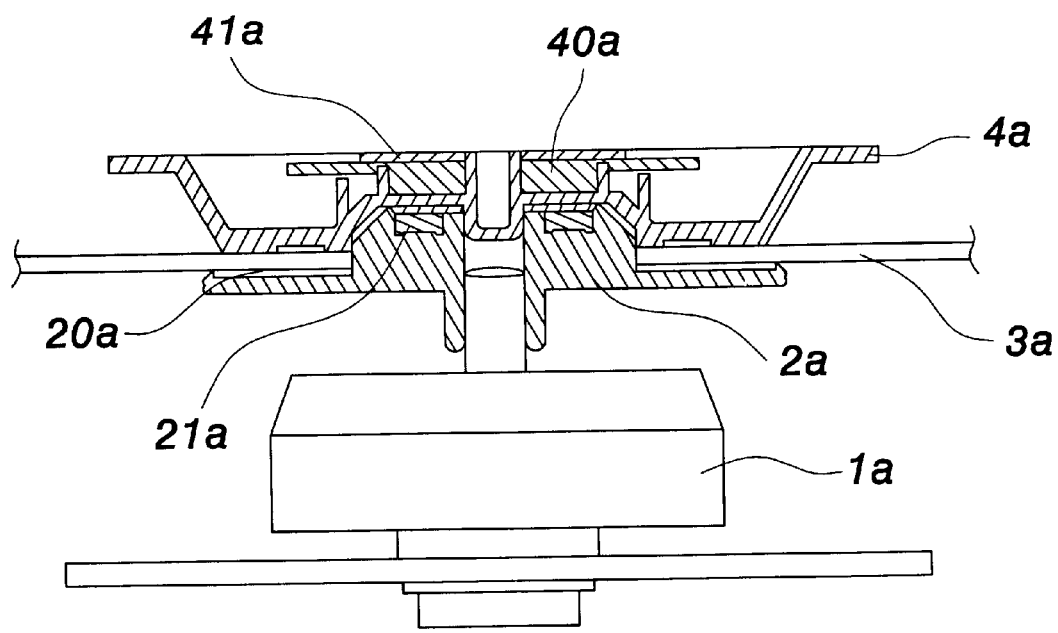
FIG. 1 shows the sectional view of prior art of a traditional clamping device.
Figure 2:
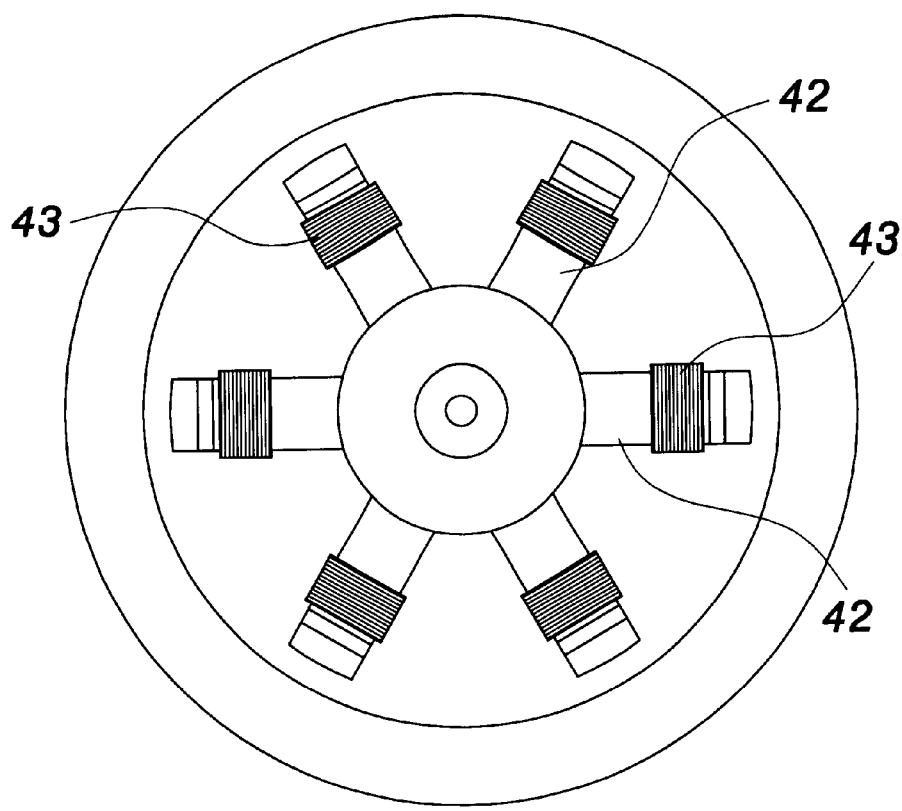
FIG. 2 shows the top view of the clamping device with variable clamping force according to the first preferred embodiment of the present invention.
Figure 3:
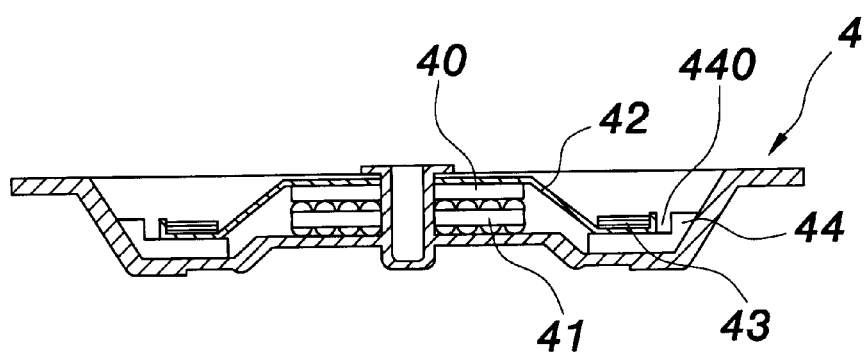
FIG. 3 shows the sectional view of the clamping device with variable clamping force according to the first preferred embodiment of the present invention.

FIGS. 2 and 3 show the top view and sectional view of the clamping device with variable clamping force according to the first preferred embodiment of the present invention. The clamping device in this preferred embodiment is a passive-type clamping device, which has a base 4 housing an annulus magnet (or an annulus yoke) 40. A resilient body 41 is fitted between the annulus magnet 40 and a bottom plate of the base 4. The resilient body 41 can be a spring, an elastic blade or a rubber. A resilient member 42 with a plurality of symmetric ribs is placed atop annulus magnet 40. The resilient member 42 can also be a spring, an elastic blade or a rubber. A mass 43 is attached on end portion of each rib of resilient member 42 thereof to designate as the eccentric amount of centrifugal force. Some stop members 44 corresponding to the resilient member 42 are located on outer rim of the base 4 for constraints.

Accordingly, the mass 43 is not subjected to centrifugal force when the spindle keeps still so that resilient member 42 is in initial condition as shown in FIGS. 2 and 3. Therefore, a gap 440 is generated between the outer edge of the resilient member 42 and the stop member 44; and the bottom side of the resilient member 42 is in contact with the top surface of stop member 44. The resilient body 41 is not subjected to downward pressure and has maximal height. At this stage, a minimal clamping force is achieved when the gap between the annulus magnet 40 and the annulus yoke 21a is maximal.

Figure 4:
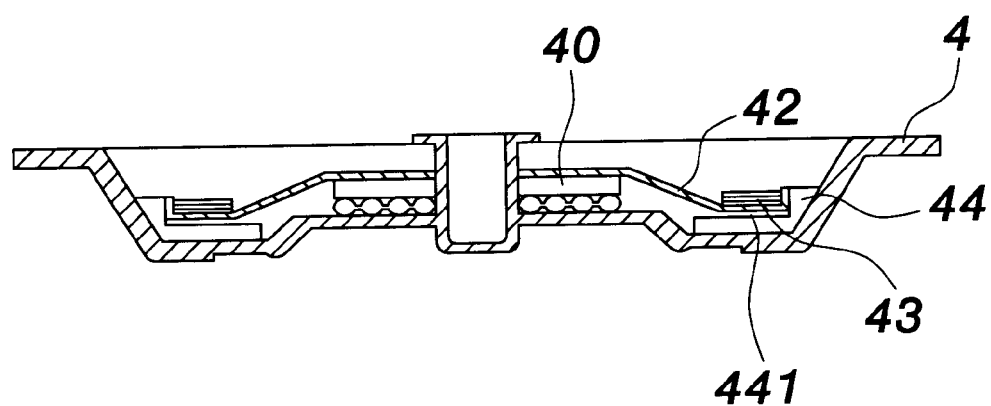
FIG. 4 demonstrates the practical application of the clamping device according to the first preferred embodiment of the present invention.

When the spindle motor is accelerated, the mass 43 is subjected to more centrifugal force and the outer edge of the resilient member 42 is forced to move outward along radial direction, as shown in FIG. 4. Therefore, the outer edge of the resilient member 42 is in contact with constraints of the stop member 44. A gap 441 is formed between the outer bottom side of the resilient member 42 and the stop member 44. The resilient member 42 is distorted to provide a downward pressure and the height of the resilient body 41 becomes smaller. The gap between the annulus magnet 40 and the annulus yoke (or the annulus magnet) of the turntable (not shown) atop the spindle motor is changed according to the variation of centrifugal force, thus providing variable clamping force. The mathematical relationship between clamping force and the rotational speed can be adjustable depending on application of optical disk drives.

Figure 5:
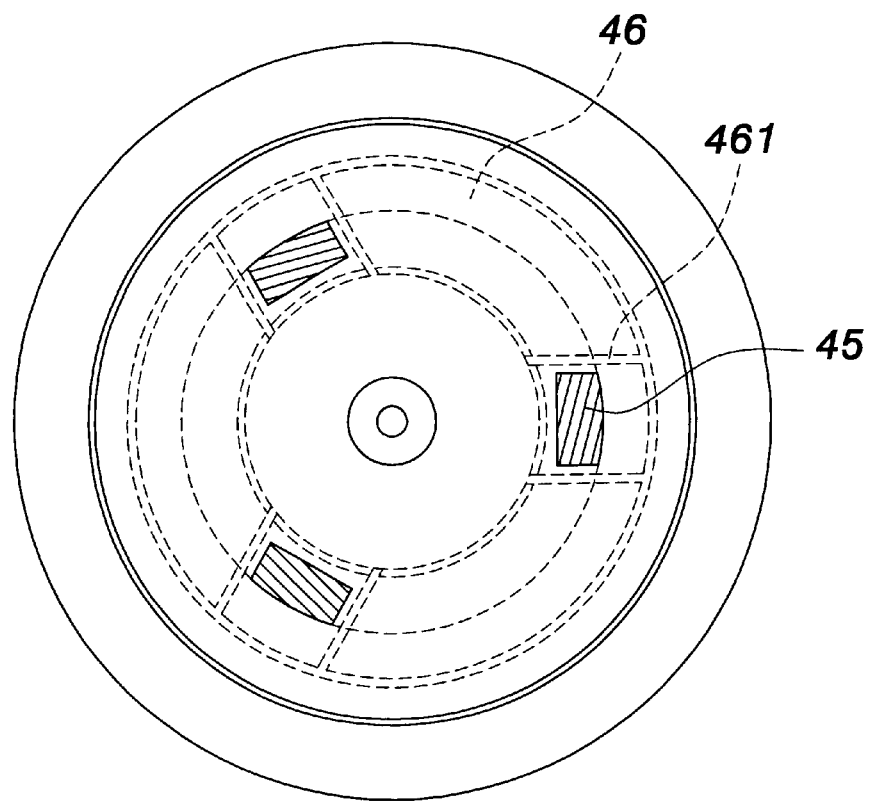
FIG. 5 shows the top view of the clamping device with variable clamping force according to the second preferred embodiment of the present invention.
Figure 6:
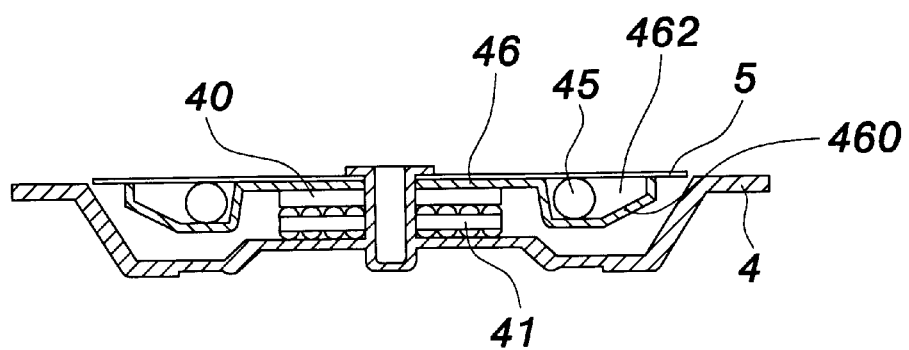
FIG. 6 shows the sectional view of the clamping device with variable clamping force according to the second preferred embodiment of the present invention.

FIGS. 5 and 6 show the top view and sectional view of the clamping device with variable clamping force according to the second preferred embodiment of the present invention. The clamping device in this preferred embodiment is a passive-type too, which has a base 4 housing an annulus magnet (or an annulus yoke) 40. A resilient body 41 is fitted between the annulus magnet 40 and a bottom plate of the base 4. The resilient body 41 can be a spring, an elastic blade or a rubber. The annulus magnet 40 has a circular plate 46 atop thereof, the circular plate 46 has a slope 460 and a plurality of rails 462, each formed by a plurality of baffle plates 461. A cylinder 45 can move freely on each rail 462 therein. The circular plate 46 has a cover 5 atop thereof to retain the cylinder 45 within the rail 462.

Accordingly, the clamping device is in initial stage as shown in FIGS. 5 and 6 before the spindle starting up. Therefore, the cylinder 45 is located at inner side of the circular plate 46. The resilient body 41 has maximal height because of no external force. At this time, the annulus magnet 40 has maximal gap with respect to the annulus yoke (or the annulus magnet) of the turntable (not shown) atop the spindle motor, thus providing minimal clamping force.

Figure 7:
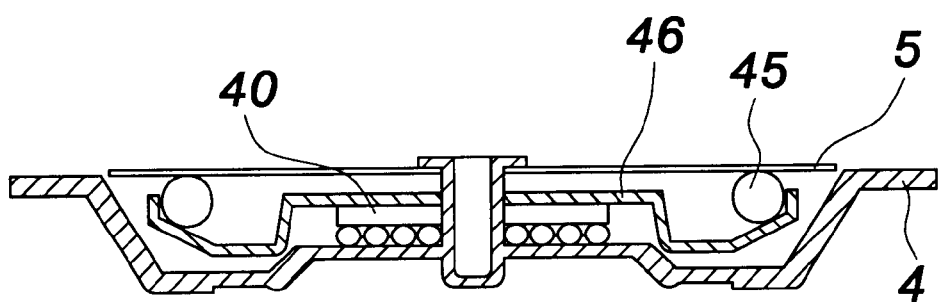
FIG. 7 demonstrates the practical application of the clamping device according to the second preferred embodiment of the present invention.

When the rotational speed of the spindle motor is increased, the cylinder 45 is subjected to centrifugal force and moves outward along the radial direction of the rail 462, as shown in FIG. 7. At this time, the cylinder 45 abuts the cover 5 due to the reaction of the slope 460. The circular plate 46 is pressed downward such that the height of the resilient body 41 is decreased. The centrifugal force is changed with the rotational speed. The gap between the annulus magnet 40 and the annulus yoke (or the annulus magnet) of the turntable (not shown) atop the spindle motor is also changed, thus providing variable clamping force. The relationship between clamping force and the rotational speed can be adjustable depends on application of optical disk drives.

According to the present invention, the clamping device with variable clamping force can provide minimal clamping force when the optical disk drive is at rest. Therefore, the disk can be unloaded with minimal operational current and power consumption. The clamping device according to the present invention can provide moderate clamping force for low rotational speed application such as CDDA and VCD disk. Meanwhile, the clamping device according to the present invention can provide maximal clamping force for high rotational speed application such as DATA disk.

To sum up, the present invention provides a variable clamping force to overcome the problems in clamping device with constant clamping force. The centrifugal force is changed with rotational speed variation such that the gap between the annulus magnet and the annulus yoke (or the annulus magnet) of the turntable (not shown) atop the spindle motor is also variable, thus providing variable clamping force.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A clamping device with a variable clamping force of an optical disk drive, comprising:

a base;

a resilient body having a restoring property and arranged in the base;

an attraction member connected above the resilient body for being attracted by a turntable of the optical disk drive;

a linking mechanism housed with the base, which enables the resilient body to change height relative to the base according to the centrifugal force caused by variation of rotational speed of the optical disk drive mounted on the base, the linking mechanism having a plurality of resilient members with symmetric ribs; and a plurality of masses respectively attached on terminals of the ribs of the resilient members.

2. The clamping device according to claim 1, wherein the attraction member is an annulus magnet or an annulus yoke.

3. A clamping device with a variable clamping force of an optical disk drive, comprising:

a base;

a resilient body having a restoring property and arranged in the base;

an attraction member connected above the resilient body for being attracted by a turntable of the optical disk drive;

a linking mechanism mounted on the base, the linking mechanism having a plurality of resilient members with symmetric ribs; and a plurality of stop members housed in the base in correspondence to the resilient member for providing displacement constraints.

4. A clamping device with a variable clamping force of an optical disk drive, comprising:

a base;

a resilient body having a restoring property and arranged in the base;

an attraction member connected above the resilient body for being attracted by a turntable of the optical disk drive; and a linking mechanism mounted on the base, the linking mechanism having a circular plate having a plurality of rails, each rail being composed of a sloped portion and a plurality of baffle plates.

5. The clamping device according to claim 4, wherein a cylinder is mounted on each of the plurality of rails and a cover is fixed atop the circular plate to maintain the cylinders within the rails.

* * * * *